United States Patent Office 2,774,746
Patented Dec. 18, 1956

2,774,746

DIETHYLENE GLYCOL BIS-CARBAMATE-FORMALDEHYDE CONDENSATES

James P. Shelley, Drexel Hill, Pa., assignor to Rohm & Haas Company, Philadelphia, Pa., a corporation of Delaware No Drawing. Application June 16, 1954,
Serial No. 437,268

19 Claims. (Cl. 260—29.4)

This invention relates to novel resin-forming reaction products of the dicarbamate (or bis-carbamate) of diethylene glycol having the formula

$$H_2NCOOCH_2CH_2OCH_2CH_2OCONH_2$$

with formaldehyde. The novel products of the present invention are characterized by solubility or ready dispersibility in water, a high molecular weight making it possible to produce highly viscous water solutions thereof, and high reactivity under acid conditions to form water-insoluble resinous condensates. Because of these several properties, the novel reaction products are peculiarly adapted for the production of coatings and films as will be pointed out in more detail hereinafter.

Reaction products of formaldehyde with various carbamates are known. Many of the simple methylol or polymethylol derivatives of such carbamates are crystalline water-soluble compounds, but because of their low molecular weight, they are not adapted to the production of films and coatings. On the other hand, high molecular weight formaldehyde condensation products of tris-carbamates of water-soluble character are known but films and coatings obtained therefrom are quite low in flexibility because of the numerous points at which cross-linking may occur. High molecular weight water-insoluble condensates which are soluble in organic solvents have been obtained from the reaction products of formaldehyde with bis-carbamates including that derived from the bis-carbamate of diethylene glycol. Such water-insoluble products, however, have disadvantages that usually accompany the use of organic solvents; namely, toxicity, flammability, the necessity for solvent recovery systems and the necessity to use organic solvents to clean the equipment employed in applying the resin-forming composition.

It has now been discovered that, under certain reaction conditions, water-soluble high molecular weight condensation products can be obtained from the reaction of formaldehyde with the bis-carbamate of diethylene glycol with or without methanol. The required conditions include the use of a narrow pH range of 2.3 to 3.5 during the reaction of the formaldehyde with the bis-carbamate in aqueous medium. The concentration of the formaldehyde and bis-carbamate in the initial reaction medium should be between 50% and 85% by weight of the total weight of the reaction medium. The molar ratio between the formaldehyde and the bis-carbamate in the reaction medium at the start of the reaction must be between 2:1 and 3.5:1. The preferred mole ratio of formaldehyde to bis-carbamate is between 2.5 and 3 moles of formaldehyde to one of the carbamate. The temperature may vary from 70° to the boiling point of the reaction medium which may be as high as 105–110° C. at normal atmospheric pressure, or higher when the reaction is carried out under pressures above normal atmospheric pressure or in the presence of other solvents which are inert to the reaction, for example, dimethylformamide.

Under the conditions just outlined, the reaction is carried out until the condensation product has a viscosity, as determined in a solution in water of a 60% "solids" concentration at 25° C., of at least 2 poises but not over 25 poises. Preferably the condensate when tested under these conditions has a viscosity between 6 and 20 poises. The "solids" referred to is determined by diluting a sample of the aqueous condensate with an equal weight of water, weighing the residue of a portion (0.6 to 0.8 gram) after heating 90 minutes at 125° C. to determine the percentage of solids in said portion and multiplying by a factor of 2 to compensate for the dilution. The time required to attain the required viscosity depends upon the several conditions of pH, concentration, temperature and ratio of formaldehyde to bis-carbamate within the ranges set out above. Depending upon the several conditions just stated, the desired molecular weight of the condensate may be attained within a period of from ten minutes to eight hours or more reaction time.

The condensation may also take place in the presence of methyl alcohol which is believed to combine with the reactants to form methylated derivatives. The proportion of methyl alcohol when used may be from 1 to 2.5 moles per mole of bis-carbamate and is preferably from 1.5 to 2 moles per mole of bis-carbamate. When the condensation is effected in the presence of methyl alcohol, it is preferred to carry out the reaction in the lower portion of the pH range, that is from 2.3 to about 2.8. When the condensation is effected in water in the absence of methyl alcohol, the preferred pH is within the range of 2.5 to 3. Ethanol or higher alcohols cannot be used since condensates with them have practically no water-compatibility or are completely water-insoluble, have poor film-forming quality unless they are dissolved in organic solvents, and washing or cleaning of equipment used for making or applying them would require the use of organic solvents.

The temperature of the reaction medium is preferably that which corresponds to the reflux or boiling temperature thereof which is generally lower when methyl alcohol is present than when the reaction medium is simply water. The preferred temperature when water alone is used as the solvent medium is from 90–100° C., but as pointed out hereinabove, higher temperatures may be employed when superatmospheric pressure is employed, whether the reaction medium contains methyl alcohol or not.

The concentration of formaldehyde and bis-carbamate when methyl alcohol is present may vary from 50% to 85%. When no methyl alcohol is present, the concentration of formaldehyde and bis-carbamate within the aqueous medium is from 50% to 75% and is preferably between 60% and 70%.

After the reaction has been effected to the viscosity within the range specified hereinabove, the reaction medium or mass is cooled to 30° C. or lower. Preferably the cooled mass is then neutralized by the addition of a suitable alkaline material such as a soluble oxide, hydroxide, or carbonate, and preferably with the hydroxide of ammonium or an alkali metal such as sodium or potassium. After neutralization with sodium or potassium hydroxide, the reaction mass still shows infinite water tolerance. When neutralized with ammonium hydroxide, however, those reaction masses, in which the higher viscosity is attained within the range specified, sometimes have less than infinite water tolerance, but in all cases the composition will stand a considerable amount of water. Generally, 10 grams of a reaction mass containing 50% resin solids and neutralized with ammonium hydroxide can be diluted with from 30–70 cc. of water at normal room temperature without forming distinct layers. However, even in those cases where neutralization reduces the water-compatibility or tolerance, the material recovers infinite tolerance to water upon re-acidification.

The reaction between the bis-carbamate and formaldehyde may be carried out generally as follows: The bis-carbamate is introduced into aqueous 37% formaldehyde producing various concentrations depending upon the ratio of formaldehyde to the carbamate, the initial concentration being about 64% when the mole ratio of formaldehyde to carbamate is 3.0:1. The dispersion on heating becomes a clear solution and it is preferred to strip water by distillation to bring the concentration to about 60% reaction product at which time sulfuric acid or other catalysts are added to reduce the pH to a value from 2.3 to 3.5, preferably from 2.3 to 2.8 if methanol is present or from 2.5 to 3.0 if methanol is absent. At this point, the viscosity of the reaction medium is generally about ½ to 1 poise (at 65% concentration). It should be understood that the acid may be added before stripping, but this is not preferred. The reaction mass is heated to condense the formaldehyde bis-carbamate reaction product to a viscosity of at least 2 poises at 60% concentration in water at 25° C. The reaction mass at this time has infinite water tolerance and retains it on partial or complete neutralization with sodium hydroxide or potassium hydroxide to a pH of 5 to 7.5.

The resulting reaction mass may have a concentration of the condensate of 50% to 70% or more and it may be used directly for coating or film-forming purposes. When so used reasonably promptly, neutralization may be omitted. Thus the unneutralized condensate formed without methanol can be used within about 12 to 24 hours whereas those formed with methanol can be used within one week to several months depending on the degree of condensation without encountering troublesome gelling.

If reasonably prompt use is not desired, the reaction mass should be treated with an alkaline material to raise the pH to a value of 5 to 7, preferably 6.0 to 6.5. It is preferred to avoid raising the pH above 6.5 because of the tendency for too much salt to be formed so that the salt tends to crystallize out of the reaction mass on standing. The partially or completely neutralized reaction mass may be stored indefinitely without dilution and transported to the point of application where an acid catalyst may be introduced just before it is applied for the formation of coatings or films. A strong acid catalyst such as sulfuric acid, toluenesulfonic acids, ethanesulfonic acid, ammonium phosphate, ammonium thiocyanate, hydrochloric or other acid salts of a hydroxy aliphatic amine including 2-methyl-2-amino-1-propanol, 2-methyl-2-amino-1,3-propandiol, tris(hydroxymethyl)-aminomethane, 2-phenyl-2-amino-1-propanol, 2-methyl-2-amino-1-pentanol, 2-aminobutanol, triethanolamine, 2-amino-2-ethyl-1-butanol, ammonium chloride, pyridine hydrochloride, and benzyldimethylamine oxalate may be used. The amine salts are water-soluble latent catalysts substantially neutral at ordinary temperature which dissociate into volatile components one of which is acidic at the elevated temperatures used for baking and curing, so that the catalyst after exerting its accelerating effect is automatically discharged from the mass during the heating stage. The amount of catalyst used may be from 1 to 6% or more by weight based on the weight of condensate solids.

Because of the water-compatibility of the reaction mass, it may be diluted to any desired extent before application merely by the addition of water.

Besides the introduction of an acid catalyst to accelerate the insolubilization of coatings, films or other products obtained from the condensate, various materials may be added for other purposes. For example, surface-active agents of anionic, non-ionic, or cationic type may be introduced to improve the flow and make the coating or film more uniform especially when the compositions are used for coating purposes. Examples of non-ionic surface-active agents include polyethylene oxide derivatives of phenol, of alkyl phenols having 6 to 18 carbon atoms in the alkyl substituent, of higher fatty acids having from 8 to 18 carbon atoms, of higher fatty alcohols or mercaptans having from 8 to 18 carbon atoms, of long chain aliphatic amides having from 8 to 18 carbon atoms, of long chain fatty amines having from 8 to 18 carbon atoms, such derivatives containing from 10 to 50 or more oxyethylene units per molecule. Besides the non-ionic surface-active agents just mentioned, anionic types such as lauryl alcohol sulfate, sodium dioctyl sulfosuccinate, the sodium salt of isopropyl naphthalenesulfonic acid, or cationic agents such as lauryl pyridinium chloride may be employed. The proportion of surface-active agent may be from 0.01 to 3% of the weight of the condensate therein.

If desired, a volatile non-aqueous solvent may be added. Preferably, any such additional solvent is water-soluble, such as ethanol, propanol, isopropanol, and t-butanol.

Besides catalyst, surface-active agent, and/or other solvent, the composition may also comprise other materials such as other thermosetting resin-forming materials such as phenol-aldehyde condensates, aminoplasts such as melamine-formaldehyde condensates, urea-formaldehyde condensates and the like, alkyds, especially the drying oil-modified alkyds, and vinyl or acrylic resins, such as polyvinyl acetate, and copolymers of 80 to 95% vinyl acetate with ethyl acrylate or methyl methacrylate. The coating composition may contain from 10% to 90% of the formaldehyde carbamate condensate and from 90% to 10% respectively of the other resin-forming material based on the total resin-forming solids.

The coatings may be clear and colorless when formed without the addition of dyes or pigments, or they may be colored by the introduction of pigments or dyes, such as titanium oxide, lithopone, carbon black, ultramarine blue or the like.

After the films or coatings are formed from the aqueous condensate containing the catalysts with or without other materials, they are dried and hardened by heating at temperatures of about 180° F. to 350° F. or higher. They are adapted to form valuable coatings on paper, textiles and particularly fabrics, metal, glass, leather, cardboard, chipboard, strawboard, wood, felt, cellophane, vinyl resin tile, asphalt tile, linoleum, and the like. They are also valuable as a gap-filling material for expansion joints or for filling cracks in wood, plaster, or masonry. Coatings on paper may be cured for 40 to 60 seconds at 250° F. to produce a final water-resistant, grease-proof, solvent-resistant, flexible film having a clear gloss that is mar-resistant, and is non-tacky and resistant to blocking even when heated as high as 210° F. These condensates apparently react with and cross-link many of the substrates mentioned above, such as those of nylon or of cellulosic type.

The aqueous compositions comprising the resin-forming condensate of the present invention have the advantage during their application of not requiring special precautions to avoid the danger of fire or toxic effects on the operators. They require no equipment for solvent recovery and water is all that is neeeded to wash off residue left on the equipment. They are also dilutable to lower concentrations so that they may be shipped as a highly concentrated aqueous composition and then diluted, especially for such textile applications as sizing, dressing and/or stiffening various fabrics, such as nylon, rayon, Orlon, Dacron and the like. These compositions which are derived from reaction media comprising methanol have the additional advantages of being substantially free from odor and producing somewhat greater flexibility in the final water-insolubilizing film or coating.

The compositions of the invention may be dried and powdered or granulated or mixed with sufficient filler and dried, pulverized etc., and the resulting dry products may be used in injection or compression molding. The undried compositions may be cast at room temperature or elevated temperatures to form flexible rods, tubes, plates, or other shaped articles. They may be used to impregnate lumber. After impregnation of the lumber and curing, the lumber has improved water-resistance and dimensional stability in the presence of moisture.

In the following examples, which are illustrative of the present invention, the glass electrode (G. E.) pH was always determined on a 5.0 g. sample of the batch which had been diluted to about 10% solids with 25.0 ml. of distilled water.

Example 1

Diethylene glycol dicarbamate (480 grams or 2.5 moles) was charged to a one-liter flask containing 613.0 g. of aqueous 36.7% formaldehyde (7.5 moles HCHO). The mixture was heated with stirring to reflux (102° C.) and held at this temperature for 15 minutes in order to allow time for some reaction to take place between formaldehyde and the carbamate before starting to strip the batch. Then the heat was shut off while the apparatus was arranged for distillation (ca 10 min.) after which heating was resumed and 63.0 g. of aqueous distillate was distilled from the reaction mixture (batch temp.=104° C. at this point). Heat was again shut off while the apparatus was arranged for total reflux (ca 15 min.). When heating was then resumed, the batch temperature was 90° C. and the pH of the batch was adjusted to 3.0 (G. E.) with 2.4 ml. of 50% aqueous $H_2SO_4$ and the batch (having about 60% solids content) was sampled for viscosity. The viscosity at this point was "A−" on the Gardner-Holdt scale at 25° C. or slightly less than ½ poise at 25° C. The batch was polymerized by heating at reflux until the viscosity on the Gardner-Holdt scale (at 25° C.) was "U+" (ca 7.0 poises at 25° C.). At this point heating was stopped and the batch was cooled. It was a clear, substantially colorless composition that was usable directly for coating purposes.

A storage-stable composition was prepared from a composition made as just outlined by diluting it with 150.0 g. of water to lower the solids content to about 50%. Next, there was charged 9.2 g. of a polyethylene oxide derivative of an octyl phenol containing about 10 oxyethylene units and finally the batch was neutralized to a pH of 7.0 (Bromthymol blue indicator) with 3.0 ml. of 50% aqueous NaOH solution.

Example 2

Diethylene glycol dicarbamate (115.2 grams or 0.6 mole) was charged to a 300 ml. flask containing 126.0 g. of aqueous 35.7% formaldehyde (1.5 moles HCHO) and heat and stirring were applied. At 50° C. the batch was acidified to pH=3.4 (G. E.) with 1.0 ml. of 25% aqueous $H_2SO_4$ and heating was continued to reflux. The reaction mixture was polymerized by heating at reflux for 10 hours until the Gardner-Holdt viscosity rose to "G" (1.65 poises). At this point heating was stopped and the reaction mixture neutralized with 0.6 ml. of 50% aqueous NaOH solution to a pH of about 7. The batch was filtered and found to possess the following constants:

Viscosity (25° C.): "H" (Gardner-Holdt)=2.0 poises
Solids: 60.5%
pH (G. E.): 7.2
Water tolerance: Infinite
Color (Paint and Varnish Colorimeter): Less than 1 (substantially colorless)

It was applied to textile fabrics of nylon and Dacron for stiffening.

Example 3

Diethylene glycol dicarbamate (768.0 grams or 4.0 moles) was charged to a 2-liter flask containing 752.0 g. of 40% HCHO solution in aqueous methanol containing 7% water (10.0 moles HCHO and 12.5 moles methanol) and heat and stirring were applied. At 70° C. 37.0 ml. of syrupy (85%) phosphoric acid was charged to the batch (pH about 2.7) and heating was continued to boiling (ca 91° C.). Then 255.0 g. of alcoholic distillate was distilled from the batch to leave a methanol-diethylene glycol carbamate ratio of 1.5:1 after which cooling was applied and 110.0 g. of water was charged to the batch. The apparatus was arranged for total reflux and the batch was polymerized by heating at reflux (ca 94.5° C.) until the viscosity moved from "I+" (ca 2.3 poises) to "W−" (ca 10 poises). At this point the batch was cooled to room temperature and filtered. A 200.0 g. sample of this resin was later treated with 2.1 g. of a polyethylene oxide derivative of an octyl phenol having an average of about 10 oxyethylene units and found to give excellent performance as a high-gloss paper coating resin.

Example 4

A mixture of 198.0 g. of paraformaldehyde (91% HCHO—6.0 moles) and 115.0 g. methanol (3.6 moles) were heated on a steam bath. While the batch was heating the pH of the mixture was adjusted to 9.5–10.0 (Thymol blue) with 50% aqueous NaOH solution. The mixture was heated at 92–95° C. for 15 minutes during which time the mixture became clear and the pH dropped to about 7 (Bromthymol blue). At the end of the 15 minutes reflux period the methanolic formaldehyde solution was cooled to about 50° C. and 384.0 g. of diethylene glycol dicarbamate (2.0 moles) was charged to the flask. Heating was resumed and the batch was acidified to a pH of 2.4 (G. E.) with 4.0 ml. 50% $H_2SO_4$. At 70° C. the rate of heat input was modified so as to maintain a batch temperature of 70–75° C. The batch was polymerized at this temperature until the viscosity increased to about 6.0 poises at which point 132.0 g. of water was charged to the batch to lower the concentration to about 60% solids. After addition of the dilution water the viscosity of the batch was 1.1 poises and the pH was 2.4. Polymerization at 70° C. was continued until the viscosity of the batch reached about 10.0 poises at which point another 132.0 g. of dilution water was charged to the batch. The batch was then adjusted to a pH of 6.3 with 6.0 ml. of 50% NaOH solution and filtered.

It is to be understood that changes and variations may be made without departing from the spirit and scope of the invention as defined in the appended claims.

We claim:

1. A composition comprising a water-soluble high molecular weight condensate of a mixture comprising the dicarbamate of diethylene glycol and formaldehyde, in which the molar ratio of formaldehyde to the dicarbamate is from 2:1 to 3.5:1, said condensate having been prepared in an aqueous medium at a pH of 2.3 to 3.5 and at a temperature of at least 70° C. and having a viscosity, at a concentration of 60% in water at 25° C., of 2 to 25 poises.

2. A composition comprising a water-soluble high molecular weight condensate of a mixture comprising the dicarbamate of diethylene glycol and formaldehyde, in which the molar ratio of formaldehyde to the dicarbamate is from 2.5:1 to 3:1, said condensate having been prepared in an aqueous medium at a pH of 2.3 to 3.5 and at a temperature of at least 70° C. and having a viscosity, at a concentration of 60% in water at 25° C., of 2 to 25 poises.

3. A composition comprising a water-soluble high molecular weight condensate of a mixture comprising the dicarbamate of diethylene glycol and formaldehyde, in which the molar ratio of formaldehyde to the dicarbamate is from 2:1 to 3.5:1, said condensate having been prepared in an aqueous medium at a pH of 2.3 to 3.5 and at a temperature of at least 70° C. and having a viscosity, at a concentration of 60% in water at 25° C., of 2 to 25 poises, said composition containing 1 to 6% by weight of an acid catalyst based on the weight of condensate.

4. A composition comprising a 50% to 70% aqueous dispersion of a water-soluble high molecular weight condensate of a mixture comprising the dicarbamate of diethylene glycol and formaldehyde, in which the molar ratio of formaldehyde to dicarbamate is from 2:1 to 3.5:1, said condensate having been prepared in an aqueous medium at a pH of 2.3 to 3.5 and at a temperature of at least 70° C. and having a viscosity, at a concentration of 60% in water at 25° C., of 2 to 25 poises.

5. A composition comprising a water-soluble film-forming, high-molecular weight condensate of a mixture comprising the dicarbamate of diethylene glycol, formaldehyde, and methanol, in which the molar ratio of formaldehyde to dicarbamate is from 2:1 to 3.5:1 and that of the methanol to the dicarbamate is 1:1 to 2.5:1, said condensate having been prepared in an aqueous medium at a pH of 2.3 to 3.5 and at a temperature of at least 70° C. and having a viscosity, at a concentration of 60% in water at 25° C., of 2 to 25 poises.

6. A composition comprising an aqueous alcoholic dispersion containing 50% to 70% of a water-soluble film-forming, high-molecular weight condensate of a mixture comprising the dicarbamate of diethylene glycol, formaldehyde, and methanol, in which the molar ratio of formaldehyde to dicarbamate is from 2.5:1 to 3:1 and that of the methanol to the dicarbamate is 1.5:1 to 2:1, said condensate having been prepared in an aqueous medium at a pH of 2.3 to 3.5 and at a temperature of at least 70° C. and having a viscosity, at a concentration of 60% in water at 25° C., of 2 to 25 poises.

7. The method of producing a water-soluble film-forming condensate comprising heating a mixture of the dicarbamate of diethylene glycol and formaldehyde, in which the molar ratio of formaldehyde to dicarbamate is between 2:1 to 3.5:1, in the presence of water at a pH of 2.3 to 3.5 and at a temperature of at least 70° C., until the viscosity of the condensate measured at 25° C. at a concentration of 60% in water is between 2 and 25 poises.

8. The method of producing a water-soluble film-forming condensate comprising heating a mixture of the dicarbamate of diethylene glycol and formaldehyde, in which the molar ratio of formaldehyde to dicarbamate is between 2:1 to 3.5:1, in the presence of water at a pH of 2.3 to 3.5 and at a temperature of at least 70° C., until the viscosity of the condensate measured at 25° C. at a concentration of 60% in water is between 2 and 25 poises, and then cooling to a temperature not over 30° C.

9. The method of producing a water-soluble film-forming condensate comprising heating a mixture of the dicarbamate of diethylene glycol and formaldehyde, in which the molar ratio of formaldehyde to dicarbamate is between 2:1 to 3.5:1, in the presence of water at a pH of 2.3 to 3.5 and at a temperature of at least 70° C., until the viscosity of the condensate measured at 25° C. at a concentration of 60% in water is between 2 and 25 poises, and then adding a water-soluble alkaline material to raise the pH to a value between 5 and 7.5.

10. The method of producing a water-soluble film-forming condensate comprising heating a mixture of the dicarbamate of diethylene glycol, formaldehyde, water, and methanol, in which the molar ratio of formaldehyde to dicarbamate is between 2:1 to 3.5:1 and that of methanol to the dicarbamate is between 1:1 to 2.5:1, at a pH of 2.3 to 3.5 and at a temperature of at least 70° C. until the viscosity of the condensate measured at 25° C. at a concentration of 60% in water is between 2 and 25 poises.

11. The method of producing a water-soluble film-forming condensate comprising heating to a temperature of at least 70° C. an aqueous medium containing 50% to 70% by weight of a mixture of the dicarbamate of diethylene glycol and formaldehyde, in which the molar ratio of formaldehyde to dicarbamate is between 2:1 and 3.5:1, at a pH of 2.3 to 3.5 until the viscosity of the condensate measured at 25° C. at a concentration of 60% in water is between 2 and 25 poises.

12. The method of producing a water-soluble film-forming condensate comprising heating to a temperature of at least 70° C. an aqueous alcoholic medium containing methanol and 50% to 70% by weight of a mixture of the dicarbamate of diethylene glycol and formaldehyde, the molar ratio of formaldehyde to the dicarbamate being between 2:1 and 3.5:1 and that of the methanol to the dicarbamate being between 1:1 and 2.5:1, at a pH of 2.3 to 3.5 until the viscosity of the condensate measured at 25° C. at a concentration of 60% in water is between 2 and 25 poises.

13. The method of producing a water-soluble film-forming condensate comprising heating to a temperature of at least 70° C. an aqueous alcoholic medium containing methanol and 50% to 70% by weight of a mixture of the dicarbamate of diethylene glycol and formaldehyde, the molar ratio of formaldehyde to the dicarbamate being between 2.5:1 and 3:1 and that of methanol to the dicarbamate being between 1.5:1 and 2.0:1, at a pH of 2.3 to 3.5 until the viscosity of the condensate measured at 25° C. at a concentration of 60% in water is between 2 and 25 poises.

14. The method of producing a water-soluble film-forming condensate comprising heating to a temperature of at least 70° C. an aqueous alcoholic medium containing methanol and 50% to 70% by weight of a mixture of the dicarbamate of diethylene glycol and formaldehyde, the molar ratio of formaldehyde to the dicarbamate being between 2.5:1 and 3:1 and that of methanol to the dicarbamate being between 1.5:1 and 2.0:1, at a pH of 2.3 to 3.5 until the viscosity of the condensate measured at 25° C. at a concentration of 60% in water is between 2 and 25 poises, and then cooling to a temperature not over 30° C.

15. The method of producing a water-soluble film-forming condensate comprising heating to a temperature of at least 70° C. an aqueous alcoholic medium containing methanol and 50% to 70% by weight of a mixture of the dicarbamate of diethylene glycol and formaldehyde, the molar ratio of formaldehyde to the dicarbamate being between 2.5:1 and 3:1 and that of methanol to the dicarbamate being between 1.5:1 and 2.0:1, at a pH of 2.3 to 3.5 until the viscosity of the condensate measured at 25° C. at a concentration of 60% in water is between 2 and 25 poises, and then adding a water-soluble alkaline material to raise the pH to a value between 5 and 7.5.

16. A method as defined in claim 15 in which the alkaline material is sodium hydroxide.

17. A method as defined in claim 15 in which the alkaline material is potassium hydroxide.

18. A method as defined in claim 15 in which the alkaline material is ammonium hydroxide.

19. A method as defined in claim 15 in which the alkaline material is ammonium hydroxide, and the final pH is between 6.0 and 6.5.

References Cited in the file of this patent

FOREIGN PATENTS

| | | |
|---|---|---|
| 491,449 | Great Britain | Sept. 1, 1938 |
| 890,878 | France | Nov. 19, 1943 |
| 695,636 | Germany | Aug. 29, 1940 |